UNITED STATES PATENT OFFICE.

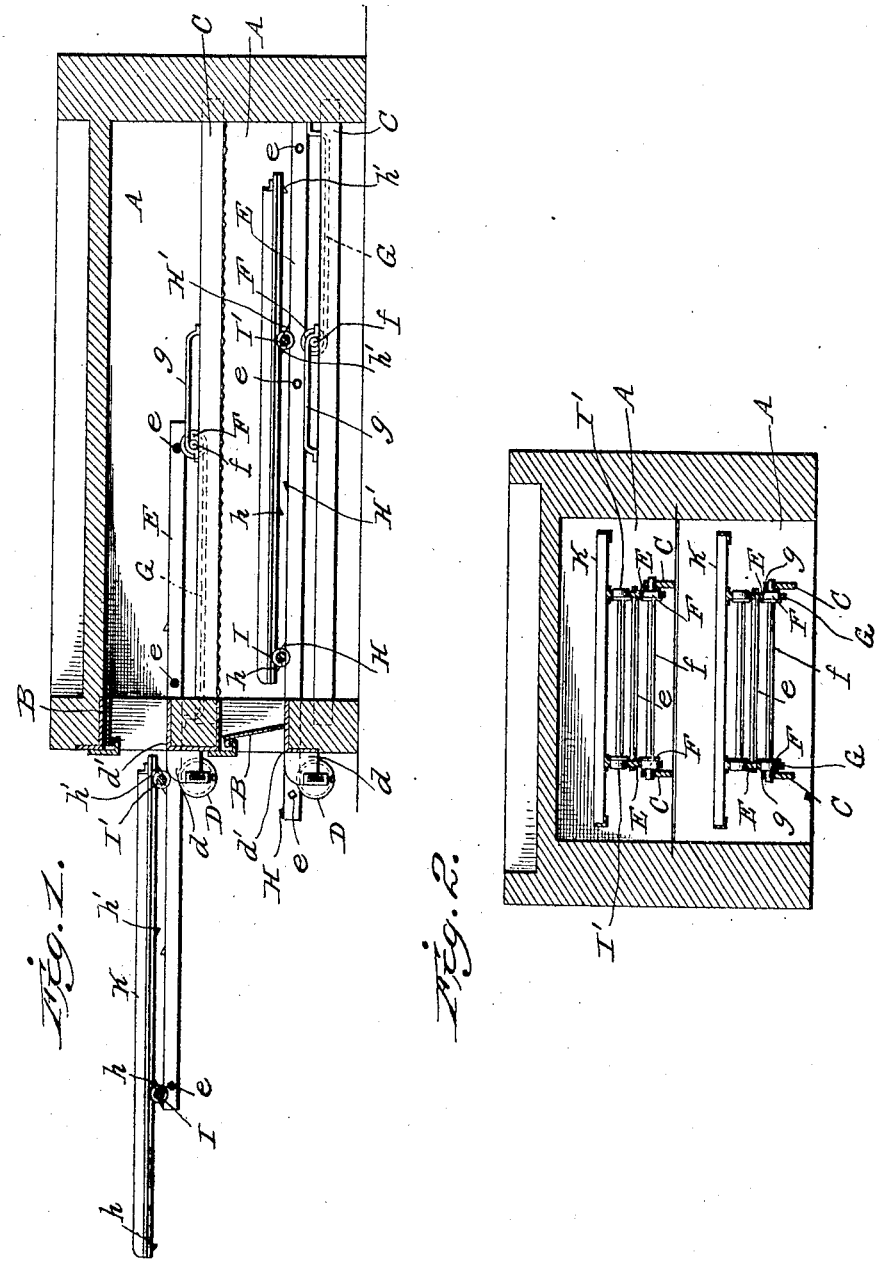

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

DRAW-PLATE BAKING-OVEN.

No. 878,434.     Specification of Letters Patent.     Patented Feb. 4, 1908.

Application filed August 9, 1904. Serial No. 220,131.

*To all whom it may concern:*

Be it known that I, FRANK H. VAN HOUTEN, of Fishkill-on-the-Hudson, county of Dutchess, State of New York, have invented certain new and useful Improvements in Draw-Plate Baking-Ovens; and I do hereby declare the following to be a full, clear, and exact description of the same, reference being had to the accompanying drawings, forming a part of this specification, and to the figures and letters of reference marked thereon.

This invention relates to draw plate baking ovens the object being to provide an improved means for facilitating the temporary removal of the baking plates from and the reinsertion of the same into the oven and for holding the baking plates in position in front of the oven in such manner as to render them easily accessible in their full length when it is desired to place the dough loaves thereon or to remove the baked loaves therefrom, or to inspect the same during the process of baking.

A further object of the invention is to provide a means for accomplishing the above ends which will do away with the necessity of employing fixed tracks or equivalent supporting devices in the space in front of the oven.

The invention consists primarily in constructing the draw plates and their carriages in the form of telescopic sections adapted, when extended, to expose the draw plates and to be entirely supported from the end projecting into the oven, thus not only dispensing with the use of tracks or hangers outside of the oven but permitting a plurality of similar carriages and plates to be located directly over each other without danger of interference.

In the accompanying drawings—Figure 1 is a vertical section through the front portion of a draw plate oven embodying the present invention, the furnace and flue arrangements being omitted as they constitute no part of the present invention. Fig. 2 is a vertical section in a plane at right angles to Fig. 1.

Similar letters of reference in the several figures indicate like parts.

The baking chambers are indicated by the letters A, A, the construction of the oven in so far as these chambers is concerned being as is usual in this type and for the sake of economy the chambers are located one over the other. At the front, each chamber has a door opening adapted to be closed by a door B and extending from front to rear in each chamber is a pair of supporting rails or tracks C, C, preferably anchored firmly in the walls of the oven. Outside the door openings rollers or wheels D are journaled in brackets or other supports d, preferably formed on the door frame d'. Said wheels or rollers are adjustably journaled in fixed position to support the forward ends of side pieces E of carriages for the baking plates the particular adjusting means shown consisting of set screws Z for supporting the journals of the rollers. These carriages are preferably formed by the side pieces E before referred to and cross pieces e. The rear ends of the side pieces rest on flanged rollers or wheels F, the axles f of which are extended and form small rollers which rest on the rails C, thus the carriages are held by roller supports to move freely in and out.

To prevent tilting of the carriages when drawn out as well as to prevent frictional resistance to their movement even though over balanced by the load at the outer ends the rollers F, f, travel in slot ways in the side pieces and rails respectively. As a convenient construction the said slot ways may be formed by strips or rods G, g, extending parallel with the rails and side pieces and secured thereto at the ends. The rollers F and the axles f, it will be noted, form differential rollers, whereby the full outward movement of the carriages effects a comparatively short traverse of the rollers along the rails and the length of the slot ways are preferably such that the rollers will form stops for limiting the movement of the carriage. The upper edges of the side pieces E are provided with stop shoulders H, H, and H', H', between which rollers I I' are mounted and adapted to travel and the baking plates K are mounted on these rollers so as to have a traverse on the carriages, such traverse being limited by the stop shoulders H and H' before referred to in conjunction with stop shoulders h, h, h', h', on the under sides of the baking plates.

When the carriages are drawn out and the plates are at the limit of their forward movement on the carriages, the rear ends of the plates are outside of the oven door openings, thus the whole length of the plates are exposed.

Obviously in drawing the plates out the carriages may be first drawn out and then the plates moved on the carriages, or the plate may be first moved on the carriages and by a continued draft on the plates the carriages will also be drawn out.

From the foregoing it will be seen that the plates may be completely exposed for removal, cleaning, or for the application to or removal therefrom of the loaves to be baked or which have been baked. The plates are supported firmly without the necessity of employing fixed rails extending away from the front of the oven either on the floor or overhead.

By making the rollers in front of the oven adjustable the draw plates can be accurately alined and positioned, an important consideration inasmuch as the walls of the oven are built of brick and it is practically impossible to build the same to such exact dimensions that the draw plates will work correctly and even though this should be accomplished, the heating, cooling and warpage of the walls and supports frequently necessitates readjustment.

Having thus described my invention what I claim as new and desire to secure by Letters Patent, is:—

An oven having fixed longitudinal rails located entirely within it and adjustable guiding and supporting rollers carried in brackets on the outside of the front wall of the oven in proximity to the door opening, a sliding carriage embodying longitudinal rails supported at all times at the front by said rollers and at the rear by the rails within the oven, differential anti-friction rollers interposed between the carriage rails and the fixed rails and a draw plate mounted on rollers traveling on the carriage rails and movable with the carriage to a position outside the oven, both of said traveling rollers working in slot ways in the rails and carriage respectively.

FRANK H. VAN HOUTEN.

Witnesses:
CLAUDE VAN NOSTRAN,
GEORGE W. GOLDSMITH.